July 26, 1938.  R. H. BURGESS  2,125,064
VARIABLE CAMBER WING FOR AIRCRAFT
Filed May 27, 1936
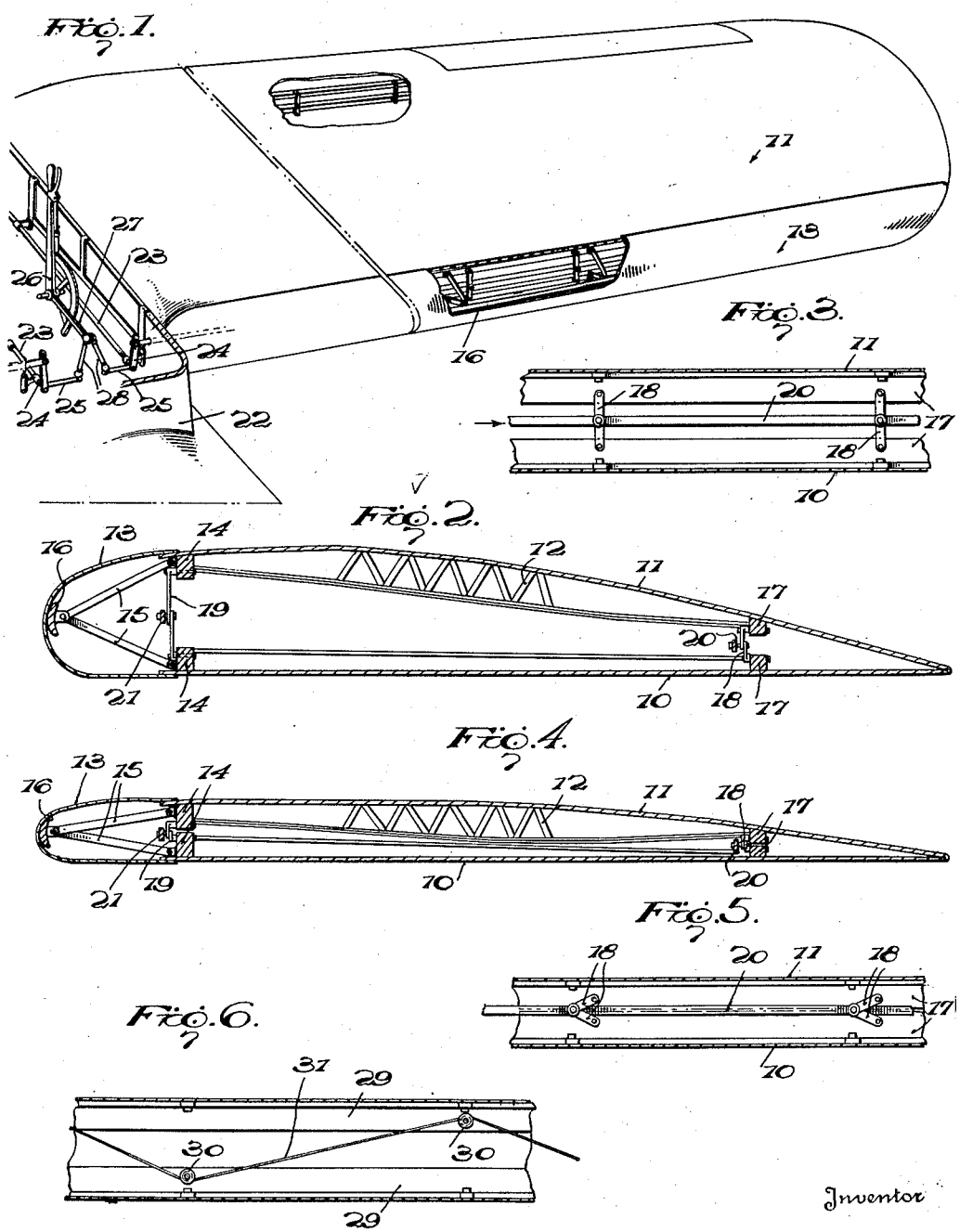
Inventor
Richard H. Burgess.
By Thos. H. Johnston
Attorney Patented July 26, 1938

2,125,064

UNITED STATES PATENT OFFICE 2,125,064

VARIABLE CAMBER WING FOR AIRCRAFT

Richard H. Burgess, San Antonio, Tex.

Application May 27, 1936, Serial No. 82,120

4 Claims. (Cl. 244—44)

This invention relates to an improved variable camber wing for aircraft and seeks, among other objects, to provide a wing wherein the camber thereof may be manually varied at will.

A further object of the invention is to provide a wing wherein the thickness of the wing may be varied for varying the camber of the wing.

Still another object is to provide a wing wherein for ground speeds and for climbing the wing may be extended in thickness for increasing the camber of the wing and consequently its lifting power while, for cruising speeds, the wing may be collapsed for decreasing the camber and consequently minimizing the head-resistance of the wing.

A further object of the invention is to provide a wing wherein the leading edge will be formed by a channel strip of resilient metal which will be flexed when the wing is extended or collapsed and wherein the flexing of said strip will tend to free the leading edge of the wing of ice.

And the invention seeks, as a still further object, to provide a wing wherein the channel strip of metal forming the leading edge of the wing will be effectually braced internally.

Other and incidental objects of the invention not specifically mentioned in the foregoing will appear during the course of the following description and in the drawing which forms a part of this application.

Figure 1 is a perspective view showing a wing constructed in accordance with the present invention and also showing a portion of a fuselage, parts being broken away.

Figure 2 is a transverse section showing the wing extended.

Figure 3 is a detail section showing the position of the toggle links when the wing is extended.

Figure 4 is a transverse section showing the wing collapsed.

Figure 5 is a detail section showing the position of the toggle links when the wing is collapsed.

Figure 6 is a detail view showing a slight modification.

In carrying the invention into effect, I employ a flat lower wing section 10 and a complemental upper curved wing section 11, the two sections being suitably connected together at their trailing edges for relative movement. The sections may be provided internally with any appropriate frame structure 12 and connecting the sections with each other at their forward extremities is a flexible channel strip 13 forming the leading edge of the wing, said strip being preferably formed of suitable resilient steel.

Extending longitudinally of the wing sections 10 and 11 adjacent the forward extremities thereof are internal oppositely disposed spars 14 and pivotally connected at corresponding ends thereof to said spars at suitably spaced points therealong are pairs of pivotally connected links 15. These pairs of links extend within the channel strip 13 and suitably fixed to the meeting ends of said links is a bracing rail 16 which bears against the channel strip at the bight thereof and extends from end to end of said strip. The rail will thus be supported by the pairs of links 15 to brace and support the channel strip internally while, however, the links will permit movement of the wing sections 10 and 11 relative to each other.

Extending longitudinally of the wing sections 10 and 11 adjacent the trailing edge of the wing are internal oppositely disposed spars 17 and pivoted thereto at suitably spaced points are pairs of toggle links 18. Pivotally connected to the spars 14 at suitably spaced points are pairs of similar toggle links 19 and pivotally connected to the meeting ends of the links 18 is a bar 20 while to the meeting ends of the links 19 is pivoted a similar bar 21. As shown in Figure 1 of the drawing, the bars 20 and 21 extend into the fuselage of the aircraft, a portion of the fuselage being shown at 22.

Journaled within the fuselage are spaced parallel shafts 23, one for each wing of the aircraft, and upstanding from said shafts near their ends are levers like the lever 24. As will be understood, the wings of the aircraft are identical and the bars 20 and 21 extend from both wings into the fuselage and are pivotally connected at their inner ends to the levers 24. Fixed to the shafts 23 near their forward ends are levers 25 and pivoted at a point between the forward end portions of said shafts is a hand lever 26 with which is associated a suitable pawl and ratchet for locking the hand lever in adjusted position. Formed on the lever 26 at its lower end is a forwardly extending arm 27 and connected to said arm by suitable ball and socket joints are links 28 which are also connected by suitable ball and socket joints to the levers 25.

As will now be seen, when the hand lever 26 is rocked forwardly, the bars 20 and 21 will be drawn inwardly with the result that the pairs of toggle links 18 and 19 will be rocked to swing the sections 10 and 11 of each wing of the aircraft toward each other. The wings will thus be collapsed, as particularly shown in Figures 4 and 5 of the drawing, for decreasing the thickness of the wings and reducing the camber thereof. Conversely, when the hand lever 26 is swung rearwardly, the bars 20 and 21 will be moved outwardly with the result that the pairs of toggle links 18 and 19 will be rocked to swing the sections 10 and 11 of each wing of the aircraft apart. The wings will thus be extended, as particularly shown in Figures 2 and 3 of the drawing, for increasing the thickness thereof and increasing the camber of the wings. Thus, the camber of the wings may be varied at will and attention is now directed to the fact that as the sections 10 and 11 of the wings are swung relative to each other, the channel strips 13 will be caused to flex to accommodate the relative movement of the sections. As will be perceived, this flexing of said strips will tend to dislodge ice therefrom and keep the leading edges of the wings free of ice formations.

In Figure 6 of the drawing I have shown a slight modification of the invention wherein each pair of truss members 29 is equipped with staggered pulleys 30 and trained over and under said pulleys is a cable 31. One end of the cable is fixed so that by pulling upon the opposite end of the cable, the truss members may be drawn together for collapsing the wing, the channel strip at the leading edge of the wing serving, when the cable is released, to swing the wing sections apart and extend the wing.

Having thus described the invention, what I claim is:

1. In an aircraft, a wing formed of upper and lower sections movable toward and away from each other for varying the camber of the wing, a resilient channel strip connecting the sections at their forward extremities and forming the leading edge of the wing, the sections being movable apart by said strip, and means for moving said sections.

2. In an aircraft, a wing formed of upper and lower sections movable toward and away from each other for varying the camber of the wing, a resilient channel strip connecting the sections at their forward extremities and forming the leading edge of the wing, links pivotally connected to the sections, a rail carried by said links bracing the strip at the bight thereof, and means for moving said sections.

3. In an aircraft, a wing formed of upper and lower sections relatively movable for varying the camber of the wing, resilient means adapted to accommodate relative movement of the sections and forming the leading edge of the wing, the sections being movable apart by said means, and means for moving said sections.

4. In an aircraft, a wing formed of upper and lower sections relatively movable for varying the camber of the wing, resilient metallic means adapted to accommodate relative movement of the sections and forming the leading edge of the wing, the sections being movable apart by said means, and means for moving the sections toward each other.

RICHARD H. BURGESS.